Figure 1:
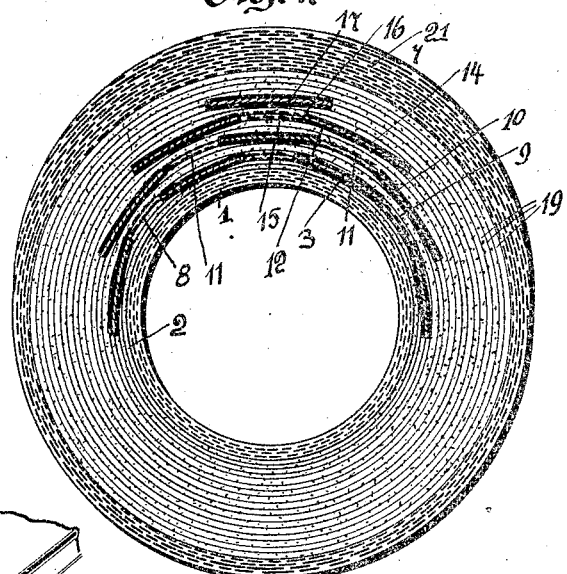

No. 828,254. PATENTED AUG. 7, 1906.
J. H. SWAIN.
TIRE.
APPLICATION FILED AUG. 14, 1905.

Witnesses:
C. Klostermann
H. H. Butler

Inventor.
James. H. Swain.
by H. C. Evert & Co.
Attorneys.

UNITED STATES PATENT OFFICE.

JAMES H. SWAIN, OF PITTSBURG, PENNSYLVANIA, ASSIGNOR, BY MESNE ASSIGNMENTS, TO H. M. & S. ARMORED TIRE COMPANY INCORPORATED, OF PITTSBURG, PENNSYLVANIA, A CORPORATION OF PENNSYLVANIA.

TIRE.

No. 828,254.　　　　Specification of Letters Patent.　　　　Patented Aug. 7, 1906.

Application filed August 14, 1905. Serial No. 274,123.

*To all whom it may concern:*

Be it known that I, JAMES H. SWAIN, a citizen of the United States of America, residing at Pittsburg, in the county of Allegheny and State of Pennsylvania, have invented certain new and useful Improvements in Tires, of which the following is a specification, reference being had therein to the accompanying drawings.

This invention relates to certain new and useful improvements in tires, and more particularly to tires for automobiles and motor-driven vehicles.

The object of this invention is to provide a non-penetrable and non-leakable tire which will withstand the rough usuage to which it is subjected.

Another object of this invention is to provide a tire wherein novel kinds of material are employed for strengthening, supporting, and adding rigidity to the tire, particularly the tread portion thereof, which is exposed to the wear and tear when the tire is being used.

A further object of this invention is to provide a tire of a resilient nature capable of holding air under high pressure, thus forming a pneumatic cushion-tire that is capable of forming a cushion for a vehicle supported by the tires constructed in accordance with my invention.

With the above and other objects in view the invention consists in the novel construction, combination, and arrangement of parts to be hereinafter more fully described and then specifically pointed out in the claims, and, referring to the drawings accompanying this application, like numerals of reference designate corresponding parts throughout the several views, in which—

Figure 4:
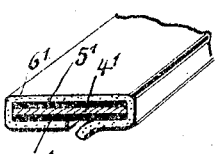
Figure 3:
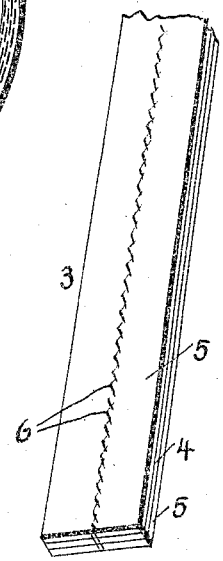
Figure 2:
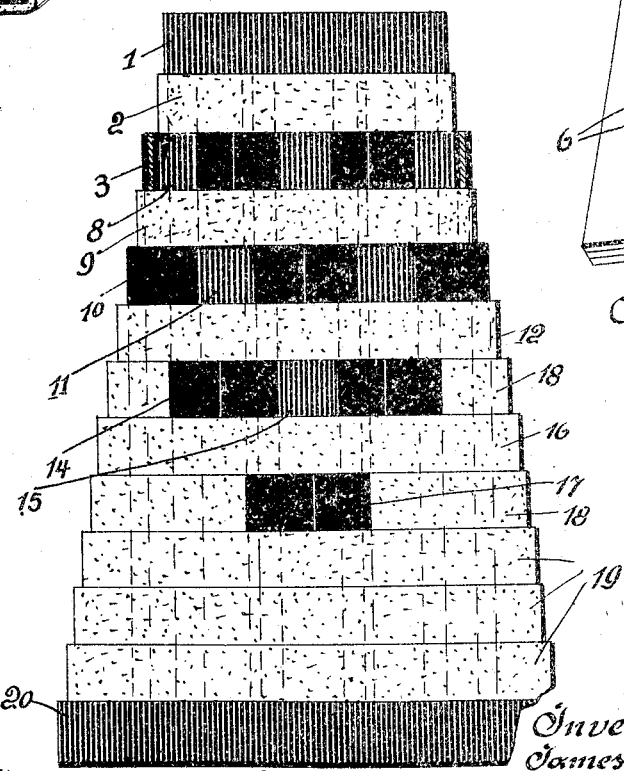

Figure 1 is a cross-sectional view of my improved tire. Fig. 2 is a plan of a portion of the tire, illustrating the various layers of material used in the construction of the tire. Fig. 3 is a detail perspective view of a portion of a strip of material employed to strengthen the tire. Fig. 4 is a cross-sectional view of a strip of strengthening material, illustrating a modified form of construction.

The present invention, like those in companion applications, Serial Nos. 271,182 and 271,183, involves the use of vulcanized fiber as one of the constituent elements in the structure of the tire. In this invention there is employed in connection with the vulcanized fiber ribbon-like strips of metal (preferably steel) which ribbon-like strips of metal are faced on both sides with the vulcanized fiber.

I am aware that it has heretofore been proposed to employ these ribbon-like strips of steel in a pneumatic tire, and since the action of the rubber in the tire on the steel has a tendency to "scale" the steel it has been proposed to cover the strips of steel with a fabric material. However, various defects have been found in tires so constructed in that the coverings employed heretofore for the steel strips were either in themselves liable to the deteriorating action of the rubber, or if of a nature to resist such action of the rubber they had a tendency to destroy the required resiliency of the tire, and are further defective in that the frictional contact between the covering material and the steel usually tends to cause the rapid destroying of the covering material to the detriment of the tire as a whole and rendering it ineffective for the purpose desired.

By the employment of vulcanized fiber as a facing or covering for the steel strips I have discovered an effective combination of materials, the vulcanized fiber effectually protecting the steel strips from the deteriorating action of the rubber and the vulcanized fiber in itself being in no wise affected by the rubber in contact therewith. Furthermore, the resiliency of these two particular materials appears in practice to have a peculiar affinity, as the desired resiliency in the tire is by no means impaired, but has in practice been demonstrated that it is improved.

To put my invention into practice, I construct my improved tire of an inner air-tube 1, which is preferably made of rubber, and surrounding this air-tube is a layer or wrapping of fabric 2, such as canvas or like material. In connection with my improved tire I employ strengthening-strips 3, which are arranged within the tire longitudinally of its length, thereby forming a peripheral strengthening-rib, which is employed particularly upon the side of the tire used for a tread. Each strengthening-strip consists of a piece of thin resilient steel 4, and secured to each side of this piece of steel are pieces of vulcanized fiber 5 5, which may be secured to the piece of steel by sewing the three pieces of material together, the stitches being represented in Fig. 3 of the drawings and designated 6. In Fig. 4 of the drawings I have illustrated another manner of securing the three pieces of material together, which consists of surrounding a piece of steel 4' and the vulcanized pieces of fiber 5' 5' with a piece of canvas or like fabric 6', this fabric being adapted to hold the three pieces together.

In Fig. 1 of the drawings the side of the tire which forms the tread is designated 7, and upon this side of the fabric wrapping or layer 2 I have shown four of the strengthening-strips 3 3 3 3, and between these strips I arrange the strips of rubber 8, these strips of rubber being arranged longitudinally of the length of the tire, similar to the strengthening-strips 3. The strips of rubber and the strengthening-strips are then surrounded by a fabric wrapping or layer of canvas 9, and upon this fabric wrapping are arranged three strengthening-strips 10 10 10, said strips being arranged directly above the rubber strips 8, interposed between the strengthening-strips 3. The strengthening-strips 10 are similar to the strengthening-strips 3 and between the strips 10 I arrange the rubber strips 11, similar to the rubber strips 8. A layer of canvas 12 or like material surrounds the strips 10 and 11, as clearly illustrated in Figs. 1 and 2 of the drawings.

Two strengthening-strips 14 14, similar to the strips 3 and 10, are arranged upon the fabric wrapping 12, and these strips 14 cover the rubber strips 11, interposed between the strips 10 10. A strip of rubber 15 is mounted between the strengthening-strips 14 14, and these strips are covered with a canvas or fabric wrapping 16. Upon this wrapping is mounted a strengthening-strip 17, similar to the strips 3, 10, and 14, this strip being arranged above the rubber strips 15, interposed between the strips 14 14. In forming the wrappings in complete by the strengthening-strips canvas or fabric material 18 is employed, and the tires so far formed are provided with three wrappings of fabric, such as canvas 19, and inclosing these wrappings and the tire construction just described is an outer tube 20, having an enlarged tread portion 21, this outer tube being preferably constructed of rubber.

By the construction of my improved tire it will be observed that the staggered arrangement of the strengthening-strips of the tire provides a foundation for the tread of the tire, this foundation being established in close proximity to the inner air-tube and terminating near the periphery of the tire. The arrangement of the strengthening-strips, especially their overlapped or lap joints, forms a non-penetrable wall between the periphery of the tire and the inner air-tube, at the same time strengthening the inner air-tube when air is forced into the same under pressure. The arrangement of the strengthening-strips permits of the tire being depressed without collapsing the same, and it will be impossible for the different parts of my improved tire to become disarranged when they have been thoroughly wrapped with the fabric heretofore described.

I desire to call particular attention to the apparent affinity between the vulcanized fiber as a facing material and the ribbon-like strips of metal, as heretofore stated. The vulcanized fiber being in itself a material which is extremely hard to puncture forms a facing which is not liable to become rough, and thus it is possible that a smooth face of the vulcanized-fiber strips is always presented to the face of the steel strips, causing no undue friction between these two materials in case of any movement of the same with respect to each other. The rubber having no effect on the vulcanized fiber, a structure is produced which remains substantially intact in its original form until the tread of the tire has been worn out.

I do not care to confine myself to the manner of assembling the different parts of the strengthening-ribs or to the particular arrangement of these ribs as illustrated in the accompanying drawings, it being understood that various changes may be made in the details of construction without departing from the spirit and scope of the invention.

What I claim, and desire to secure by Letters Patent, is—

1. A tire of the class described consisting of an inner air-tube, a fabric wrapping surrounding said tube, strengthening-strips arranged upon said fabric wrapping, resilient strips interposed between the edges of said strengthening-strips, fabric wrappings interposed between said strengthening-strips, fabric wrappings surrounding said strengthening-strips, and a surrounding outer tube, substantially as described.

2. A tire of the class described consisting of an inner tube, canvas wrappings surrounding said tube, strengthening-strips interposed between said wrappings, resilient strips mounted between the edges of said strengthening-strips, and a surrounding outer tube, substantially as described.

3. A tire of the class described consisting of an inner tube, fabric wrappings surrounding said tube, strengthening-strips interposed between said wrappings, said strips consisting of pieces of steel and vulcanized fiber, and an outer tube surrounding said fabric wrappings, substantially as described.

4. A tire of the class described consisting of an inner tube, an outer tube, canvas wrappings interposed between said tubes, strengthening-strips interlocked between said wrappings, and rubber strips interposed between the edges of said strengthening-strips, substantially as described.

5. A tire of the class described consisting of canvas wrappings, overlapping strengthening-strips interposed between said wrappings, and resilient strips mounted between the edges of said strengthening-strips, substantially as described.

6. In a pneumatic tire, an air-tube, and an outer tube, combined with interposed spaced strengthening-strips arranged in successive layers, the edges of one layer overlapping the edges of the adjacent layer, each strengthening-strip embodying a strip of steel faced on each side with a strip of vulcanized fiber.

7. In a pneumatic tire, an air-tube and an outer tube, combined with interposed spaced strengthening-strips of steel faced with vulcanized fiber, and resilient strips arranged between the adjacent edges of said strengthening-strips.

8. In a pneumatic tire, an air-tube, and an outer tube, and interposed strengthening-strips of steel faced with vulcanized fiber.

9. In a pneumatic tire, an air-tube protected on the tread side of the tire by a plurality of thin ribbon-like strips of metal having a strip of vulcanized fiber on each face, the fiber and the metal being secured together.

10. In a pneumatic tire, an air-tube protected on the tread side of the tire by a plurality of spaced strips arranged in successive layers with the edges of the strips of one layer overlapping the edges of adjacent strips, each of said strips formed of thin ribbon-like strips of metal faced on both sides with a layer of vulcanized fiber fastened to the metal strips.

11. In a pneumatic tire, an air-tube, and an outer tube, and strengthening and protective strips interposed between the said tubes, each strip embodying a strip of steel and strips of thin vulcanized fiber on the opposite faces of the steel strip.

In testimony whereof I affix my signature in the presence of two witnesses.

JAMES H. SWAIN.

Witnesses:
JOHN GROETZINGER
K. H. BUTLER.